US011498564B2

(12) United States Patent
Goh et al.

(10) Patent No.: US 11,498,564 B2
(45) Date of Patent: Nov. 15, 2022

(54) CONTROLLING A VEHICLE THAT IS SKIDDING (71) Applicant: Toyota Research Institute, Inc., Los Altos, CA (US)

(72) Inventors: Yan Ming Jonathan Goh, Palo Alto, CA (US); Avinash Balachandran, Sunnyvale, CA (US)

(73) Assignee: Toyota Research Institute, Inc., Los Altos, CA (US)

( * ) Notice: Subject to any disclaimer, the term of this patent is extended or adjusted under 35 U.S.C. 154(b) by 169 days.

(21) Appl. No.: 16/997,391

(22) Filed: Aug. 19, 2020

(65) Prior Publication Data
US 2022/0055625 A1 Feb. 24, 2022

(51) Int. Cl.
*B60W 30/18* (2012.01)
*B60W 30/188* (2012.01)
(Continued)

(52) U.S. Cl.
CPC .. *B60W 30/18172* (2013.01); *B60W 30/1882* (2013.01); *B60W 40/103* (2013.01);
(Continued)

(58) Field of Classification Search
CPC ....... B60W 30/18172; B60W 30/1882; B60W 40/103; B60W 40/114; B60W 50/14; B60W 2520/105; B60W 2520/14; B60W 2520/20
See application file for complete search history.

(56) References Cited

U.S. PATENT DOCUMENTS 5,107,429 A 4/1992 Sol
6,076,033 A 6/2000 Hamada et al.
(Continued)

FOREIGN PATENT DOCUMENTS

CN 110696829 A 1/2020
JP 2005195175 A 7/2005

OTHER PUBLICATIONS

Goh, et al., "Towards Automated Vehicle Control Beyond the Stability Limits: Drifting Along a General Path," Journal of Dynamic Systems, Measurement, and Control, Oct. 2019, pp. 1-2.
(Continued)

*Primary Examiner* — Peter D Nolan
*Assistant Examiner* — Tanya C Sienko
(74) *Attorney, Agent, or Firm* — Christopher G. Darrow; Darrow Mustafa PC (57) ABSTRACT Coordinates of a point, representing a current pair of states of a vehicle, can be determined to be outside of a first curve. An interior of the first curve, representing a first region of operation of the vehicle, can be characterized by values of forces produced by tires being less than a saturation force. A distance between the point and a second curve can be determined. An interior of the second curve, representing a second region of operation of the vehicle, can be characterized by an ability of an operation of a control system to cause the vehicle to change from being operated in the current pair of states to being operated in the first region of operation. A manner in which the vehicle changes from being operated in the current pair of states to being operated in a different pair of states can be controlled based on the distance.

20 Claims, 4 Drawing Sheets (51) Int. Cl.
*B60W 50/14* (2020.01)
*B60W 40/114* (2012.01)
*B60W 40/103* (2012.01)

(52) U.S. Cl.
CPC .......... *B60W 40/114* (2013.01); *B60W 50/14* (2013.01); *B60W 2520/105* (2013.01); *B60W 2520/14* (2013.01); *B60W 2520/20* (2013.01)

(56) References Cited

U.S. PATENT DOCUMENTS

| | | | |
|---|---|---|---|
| 8,718,841 | B2 | 5/2014 | Cherepinsky |
| 10,077,051 | B2 | 9/2018 | Reinisch et al. |
| 10,513,254 | B2 | 12/2019 | Fodor et al. |
| 10,562,524 | B2 | 2/2020 | Swamidason |
| 2004/0102886 | A1* | 5/2004 | Lin .................. B62D 6/04 701/1 |
| 2005/0060082 | A1 | 3/2005 | Heuer et al. |
| 2019/0118614 | A1 | 4/2019 | Betz et al. |
| 2019/0146498 | A1 | 5/2019 | Balachandran et al. |

OTHER PUBLICATIONS

Jonathan Yan Ming Goh, "Automated Vehicle Control Beyond the Stability Limits," Jun. 2019, pp. 1-170.

Sill et al., "Cascaded Predictive Control of Tire Force Saturation Levels for Vehicle Stability," Proceedings of the ASME 2014 International Design Engineering Technical Conferences & Computers and Information in Engineering Conference, Aug. 2014, Buffalo, New York, USA, pp. 1-9.

Goh et al., "Toward Automated Vehicle Control Beyond the Stability Limits: Drifting Along a General Path," Journal of Dynamic Systems, Measurement, and Control, Feb. 2020, vol. 142, pp. 1-10.

Beal et al., "Controlling Vehicle Instability Through Stable Handling Envelopes," Jan. 2011, pp. 1-9, found at https://www.researchgate.net/publication/267491684.

Chindamo et al., "On the Vehicle Sideslip Angle Estimation: A Literature Review of Methods, Models, and Innovations," Applied Sciences, Mar. 2018, vol. 8, pp. 1-20.

Yin et al., "Wheel-slip control for decentralized EVs," Vehicle Dynamics International, Mar. 2020, pp. 1-25.

Unknown, "Direct Adaptive Steering," Nissan Technological Development Activities, (last accessed May 14, 2020, pp. 1-2,) found at https://www.nissan-global.com/EN/TECHNOLOGY/OVERVIEW/direct_adaptive_steering.html.

Unknown, "Electronic stability control," (last accessed Apr. 9, 2020, pp. 1-17,) found at https://en.wikipedia.org/wiki/Electronic_stability_control.

Bjorn Carey, "Engineers show how an autonomous, drifting Delorean can improve driver safety," Dec. 23, 2019, pp. 1-6, found at https://techxplore.com/news/2019-12-autonomous-drifting-delorean-driver-safety.html.

Joop Van Gerwen, "Haptic feedback on the steering wheel to maximize front axle grip," Apr. 3, 2012, pp. 1-72.

Carsten et al., "How can humans understand their automated cars? HMI principles, problems and solutions," Cognition, Technology & Work, 2019, vol. 21, pp. 3-20.

Gaffary et al., "The Use of Haptic and Tactile Information in the Car to Improve Driving Safety: A Review of Current Technologies," Frontiers in ICT, Mar. 2018, vol. 5, article 5, pp. 1-11.

Tom Phillips, "Trends in car Human-Machine Interface (HMI)," Automotive IQ, 2019, pp. 1-5, found at https://www.automotive-iq.com/car-body-and-materials/articles/trends-in-car-human-machine-interface-hmi-part-1.

Grip et al., "Vehicle Sideslip Estimation," IEEE Control Systems Magazine, pp. 36-52, Oct. 2009, vol. 29.

Hossain et al., "HMI Design: An Analysis of a Good Display for Seamless Integration Between User Understanding and Automatic Controls," American Society for Engineering Education, 2012, pp. 1-14.

* cited by examiner

CONTROLLING A VEHICLE THAT IS SKIDDING

TECHNICAL FIELD

The disclosed technologies are directed to controlling a vehicle in a situation in which a value of a force of a tire of the vehicle is greater than a saturation force of the tire.

BACKGROUND

If a value of a force produced by a tire of a vehicle is greater than a saturation force of the tire, then a relationship that exists between the tire and a surface in contact with the tire can be characterized as a skid. Such a skid can cause the vehicle to experience oversteer, a spin, a spinout, a fishtail, or the like. Oversteer can be characterized by a situation in which the rear wheels lose traction during cornering, which can cause the vehicle to follow a turning radius that is smaller than an intended turning radius. A spin can be characterized by a situation in which the vehicle experiences a rotation in a single direction during the skid. A spinout can be characterized by a situation in which such a rotation does not respond to an operation of a control system of the vehicle. A fishtail can be characterized by a situation in which a yaw of the vehicle changes, with respect to a principal direction of motion of the vehicle, from a rotation in a first direction to a rotation in a second direction.

SUMMARY

In an embodiment, a system for controlling a vehicle can include one or more processors, a data store, and a memory. The one or more processors can be disposed in the vehicle. The data store can be communicably coupled to the one or more processors. The data store can store coordinates of a plane. The plane can be defined by a first axis and a second axis. The first axis can represent a first measurable state of the vehicle. The second axis can represent a second measurable state of the vehicle. The memory can be communicably coupled to the one or more processors. The memory can store a current position module, a first closed curve comparison module, a second closed curve comparison module, and a control module. The current position module can include instructions that when executed by the one or more processors cause the one or more processors to determine coordinates of a point on the plane, the coordinates of the point representing a current pair of states of the vehicle. The first closed curve comparison module can include instructions that when executed by the one or more processors cause the one or more processors to determine that the point is outside of a first closed curve on the plane. Coordinates inside of the first closed curve can represent a first region of dynamic operation of the vehicle. The first region of dynamic operation can be characterized by values of forces produced by rear tires of the vehicle being less than a tire saturation force of the rear tires. The second closed curve comparison module can include instructions that when executed by the one or more processors cause the one or more processors to determine, in response to the point being outside of the first closed curve, a distance between the point and a second closed curve on the plane. Coordinates inside of the second closed curve can represent a second region of dynamic operation of the vehicle. The second region of dynamic operation can be characterized by an ability of an operation of a control system of the vehicle to cause the vehicle to change from being operated in the current pair of states to being operated in the first region of dynamic operation. The control module can include instructions that when executed by the one or more processors cause the one or more processors to control, based on the distance between the point and the second closed curve, a manner in which the vehicle is caused to change from being operated in the current pair of states to being operated in a different pair of states. Coordinates of a different point, on the plane, can represent the different pair of states. A distance between the different point and the second closed curve can be greater than the distance between the point and the second closed curve.

In another embodiment, a method for controlling a vehicle can include determining, by a processor disposed in the vehicle, coordinates of a point on a plane. The plane can be defined by a first axis and a second axis. The first axis can represent a first measurable state of the vehicle. The second axis can represent a second measurable state of the vehicle. The coordinates of the point can represent a current pair of states of the vehicle. The method can include determining, by the processor, that the point is outside of a first closed curve on the plane. Coordinates inside of the first closed curve can represent a first region of dynamic operation of the vehicle. The first region of dynamic operation can be characterized by values of forces produced by rear tires of the vehicle being less than a tire saturation force of the rear tires. The method can include determining, by the processor and in response to the point being outside of the first closed curve, a distance between the point and a second closed curve on the plane. Coordinates inside of the second closed curve can represent a second region of dynamic operation of the vehicle. The second region of dynamic operation can be characterized by an ability of an operation of a control system of the vehicle to cause the vehicle to change from being operated in the current pair of states to being operated in the first region of dynamic operation. The method can include controlling, by the processor and based on the distance between the point and the second closed curve, a manner in which the vehicle is caused to change from being operated in the current pair of states to being operated in a different pair of states. Coordinates of a different point, on the plane, can represent the different pair of states. A distance between the different point and the second closed curve can be greater than the distance between the point and the second closed curve.

In another embodiment, a non-transitory computer-readable medium for controlling a vehicle can include instructions that when executed by one or more processors cause the one or more processors to determine coordinates of a point on a plane. The plane can be defined by a first axis and a second axis. The first axis can represent a first measurable state of the vehicle. The second axis can represent a second measurable state of the vehicle. The coordinates of the point can represent a current pair of states of the vehicle. The non-transitory computer-readable medium can include instructions that when executed by one or more processors cause the one or more processors to determine that the point is outside of a first closed curve on the plane. Coordinates inside of the first closed curve can represent a first region of dynamic operation of the vehicle. The first region of dynamic operation can be characterized by values of forces produced by rear tires of the vehicle being less than a tire saturation force of the rear tires. The non-transitory computer-readable medium can include instructions that when executed by one or more processors cause the one or more processors to determine, in response to the point being outside of the first closed curve, a distance between the point and a second closed curve on the plane. Coordinates inside of the second closed curve can represent a second region of dynamic operation of the vehicle. The second region of dynamic operation can be characterized by an ability of an operation of a control system of the vehicle to cause the vehicle to change from being operated in the current pair of states to being operated in the first region of dynamic operation. The non-transitory computer-readable medium can include instructions that when executed by one or more processors cause the one or more processors to control, based on the distance between the point and the second closed curve, a manner in which the vehicle is caused to change from being operated in the current pair of states to being operated in a different pair of states. Coordinates of a different point, on the plane, can represent the different pair of states. A distance between the different point and the second closed curve can be greater than the distance between the point and the second closed curve.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

The disclosed technologies are directed to controlling a vehicle in a situation in which a value of a force of a tire of the vehicle is greater than a saturation force of the tire. In such a situation a relationship that exists between the tire and a surface in contact with the tire can be characterized as a skid. Measurable states of the vehicle can be determined and used to ascertain whether or not the vehicle is in the situation in which the value of the force of the rear tire of the vehicle is greater than the saturation force of the rear tire. Such measurable states can include, for example, a sideslip, a yaw rate, a wheel slip rate, a rotational rate, a drift rate, or the like.

For example, a plane can be defined by a first axis and a second axis. The first axis can represent a first measurable state of the vehicle. For example, the first measurable state can be a sideslip. The second axis can represent a second measurable state of the vehicle. For example, the second measurable state can be a yaw rate. Coordinates of a point on the plane can be determined. The coordinates of the point can represent a current pair of states of the vehicle. A first closed curve can be on the plane. Coordinates inside of the first closed curve can represent a first region of dynamic operation of the vehicle. The first region of dynamic operation can be characterized by values of forces produced by rear tires of the vehicle being less than the tire saturation force of the rear tires. A second closed curve can be on the plane. Coordinates inside of the second closed curve can represent a second region of dynamic operation of the vehicle. The second region of dynamic operation can be characterized by an ability of an operation of a control system of the vehicle to cause the vehicle to change from being operated in the current pair of states (i.e., in the second region of dynamic operation) to being operated in the first region of dynamic operation. Coordinates outside of the second closed curve can represent a third region of dynamic operation of the vehicle. The third region of dynamic operation can be characterized by an inability of the operation of the control system of the vehicle to cause the vehicle to change from being operated in the current pair of states (i.e., in the third region of dynamic operation) to being operated in the first region of dynamic operation.

The point (representing the current pair of states of the vehicle) can be determined to be outside of the first closed curve. In response to the point being outside of the first closed curve, a distance between the point and the second closed curve can be determined. Based on the distance between the point and the second closed curve, a manner in which the vehicle is caused to change from being operated in the current pair of states to being operated in a different pair of states can be controlled. Coordinates of a different point, on the plane, can represent the different pair of states. A distance between the different point and the second closed curve can be greater than the distance between the point and the second closed curve.

In a first alternative implementation, the manner can include, for example, receiving safety data, indicative of the coordinates of the point, from a safety sensor system. In the first alternative implementation, the manner can include, for example, producing a safety signal and transmitting the safety signal to a safety actuator system.

In a second alternative implementation, the manner can include, for example, receiving control data, in response to an action performed by an operator of the vehicle, from a control sensor system of the control system. In the second alternative implementation, the manner can include, for example, receiving a control signal from a controller of the control system, producing a modified control signal, and transmitting the modified control signal to a control actuator system of the control system.

In a third alternative implementation, the manner can include, for example, receiving control data, in response to an action performed by an operator of the vehicle, from a control sensor system of the control system. In the third alternative implementation, the manner can include, for example, producing modified control data and transmitting the modified control data to a controller of the control system.

In a fourth alternative implementation, the manner can include, for example, determining an existence of a condition. The condition can be that the distance between the point and the second closed curve is greater than a threshold distance. In the fourth alternative implementation, the manner can include, for example, refraining, in response to a determination of the existence of the condition, from transmitting a safety signal to a safety actuator system. In the fourth alternative implementation, the manner can include, for example, causing, in response to the determination of the existence of the condition, a communication to be provided to an operator of the vehicle. In the fourth alternative implementation, the manner can include, for example, causing, in response to a determination of a lack of the existence of the condition, a transmission of the safety signal to the safety actuator system.

Figure 1:
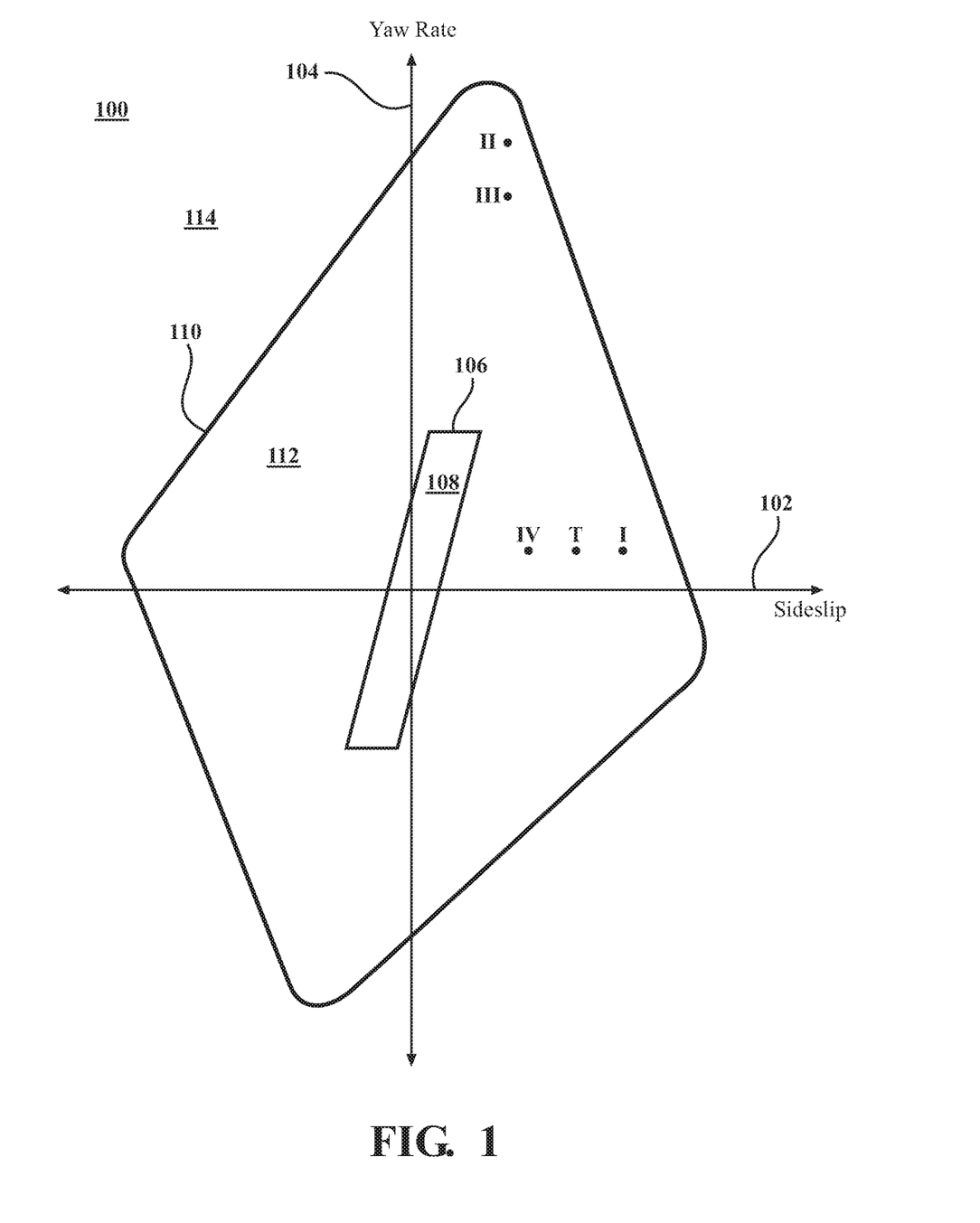
FIG. 1 is a graph of a plane defined by a first axis, which represents a first measurable state of a vehicle, and a second axis, which represents a second measurable state of the vehicle, according to the disclosed technologies.

FIG. 1 is a graph of a plane 100 defined by a first axis 102, which represents a first measurable state of a vehicle, and a second axis 104, which represents a second measurable state of the vehicle, according to the disclosed technologies. For example, the first measurable state can be a sideslip and the second measurable state can be a yaw rate. A first closed curve 106 can be on the plane 100. Coordinates inside of the first closed curve can represent a first region of dynamic operation 108 of the vehicle. The first region of dynamic operation 108 can be characterized by values of forces produced by rear tires of the vehicle being less than a tire saturation force of the rear tires. A second closed curve 110 can be on the plane 100. Coordinates inside of the second closed curve can represent a second region of dynamic operation 112 of the vehicle. The second region of dynamic operation 112 can be characterized by an ability of an operation of a control system of the vehicle to cause the vehicle to change from being operated in the second region of dynamic operation 112 to being operated in the first region of dynamic operation 108. Coordinates outside of the second closed curve 110 can represent a third region of dynamic operation 114 of the vehicle. The third region of dynamic operation 114 can be characterized by an inability of the operation of the control system of the vehicle to cause the vehicle to change from being operated in the third region of dynamic operation 114 to being operated in the first region of dynamic operation 108.

Figure 2:
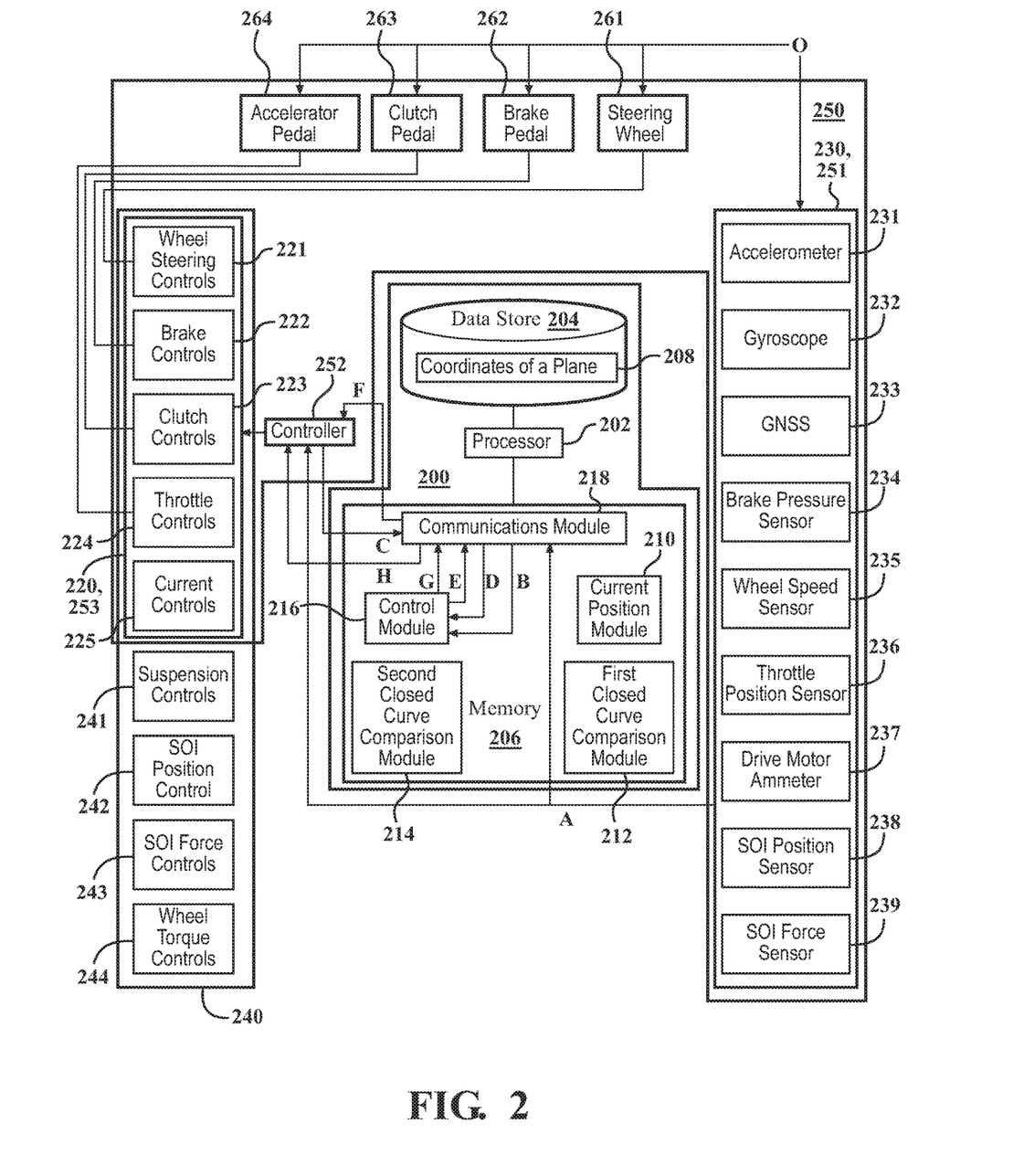
FIG. 2 includes a block diagram that illustrates an example of a system for controlling a vehicle, according to the disclosed technologies.

FIG. 2 includes a block diagram that illustrates an example of a system 200 for controlling a vehicle, according to the disclosed technologies. The system 200 can include, for example, a processor 202, a data store 204, and a memory 206. The processor 202 can be disposed in the vehicle. The data store 204 can be communicably coupled to the processor 202. The data store 204 can store, for example, coordinates of a plane 208. The plane can be defined by a first axis and a second axis. The first axis can represent a first measurable state of the vehicle. For example, the first measurable state can be a sideslip. The second axis can represent a second measurable state of the vehicle. For example, the second measurable state can be a yaw rate. For example, the plane can be the plane 100 illustrated in FIG. 1. The memory 206 can be communicably coupled to the processor 202. The memory 206 can store, for example, a current position module 210, a first closed curve comparison module 212, a second closed curve comparison module 214, and a control module 216.

The current position module 210 can include instructions that function to control the processor 202 to determine coordinates of a point on the plane. The coordinates of the point can represent a current pair of states of the vehicle. With reference to FIG. 1, for example, the point can be a point I.

Returning to FIG. 2, the first closed curve comparison module 212 can include instructions that function to control the processor 202 to determine that the point is outside of a first closed curve on the plane. Coordinates inside of the first closed curve can represent a first region of dynamic operation of the vehicle. The first region of dynamic operation can be characterized by values of forces produced by rear tires of the vehicle being less than a tire saturation force of the rear tires. With reference to FIG. 1, for example, the point I can be determined to be outside of the first closed curve 106. Thus, in the current pair of states, a relationship that exists between at least one of the rear tires and a surface in contact with the at least one of the rear tires can be characterized as a skid.

Returning to FIG. 2, the second closed curve comparison module 214 can include instructions that function to control the processor 202 to determine, in response to the point being outside of the first closed curve, a distance between the point and a second closed curve on the plane. Coordinates inside of the second closed curve can represent a second region of dynamic operation of the vehicle. The second region of dynamic operation can be characterized by an ability of an operation of a control system 220 of the vehicle to cause the vehicle to change from being operated in the current pair of states to being operated in the first region of dynamic operation. With reference to FIGS. 1 and 2, for example, the distance between the point I and the second closed curve 110 can be determined.

Returning to FIG. 2, the control system 220 can include, for example, one or more of a subsystem that controls a steering of a set of wheels of the vehicle 221 (e.g., a front set of wheels, a rear set of wheels, or both), a subsystem that controls a brake of one or more wheels of the vehicle 222, a subsystem that controls a clutch of the vehicle 223, a subsystem that controls a position of a throttle of the vehicle 224 (e.g., if the vehicle is propelled by an internal combustion engine), a subsystem that controls an amount of current conveyed to an electric drive motor of the vehicle 225 (e.g., if the vehicle is propelled by an electric motor), or the like. For example, the subsystem that controls the steering of the set of wheels of the vehicle 221 can include a mechanical steering device. For example, the subsystem that controls the brake of the one or more wheels of the vehicle 222 can include a mechanical braking device. For example, the subsystem that controls the clutch of the vehicle 223 can include a mechanical clutch device. For example, the subsystem that controls the position of the throttle of the vehicle 224 can include a mechanical throttling device.

The control module 216 can include instructions that function to control the processor 202 to control, based on the distance between the point and the second closed curve, a manner in which the vehicle is caused to change from being operated in the current pair of states to being operated in a different pair of states. Coordinates of a different point, on the plane, can represent the different pair of states. A distance between the different point and the second closed curve can be greater than the distance between the point and the second closed curve.

In a first alternative implementation, the memory 206 can further store a communications module 218. The communications module 218 can include instructions that function to control the processor 202 to receive safety data from a safety sensor system 230. The safety data can be indicative of the coordinates of the point. The safety sensor system 230 can include, for example, one or more of an accelerometer 231, a gyroscope 232, a global navigation satellite system (GNSS) 233, a brake pressure sensor 234, a wheel speed sensor 235, a throttle position sensor 236 (e.g., if the vehicle is propelled by an internal combustion engine), an electric drive motor ammeter 237 (e.g., if the vehicle is propelled by an electric motor), a steering operator interface (SOI) position sensor 238, a steering operator interface (SOI) applied force sensor 239, or the like. For example, a steering operator interface (SOI) can be a steering wheel, a handlebar, a twin lever steering interface, or the like. For example, the safety data can include a measure of a sideslip and a measure of a yaw rate. For example, a sideslip can be estimated with the accelerometer 231 and the gyroscope 232. For example, a yaw rate can be estimated with the gyroscope 232. The communications module 218 can further include instructions that function to control the processor 202 to transmit the safety data to the current position module 210. The instructions of the current position module 210 can function to control the processor 202 to determine, based on the safety data, the coordinates of the point.

Additionally or alternatively, in the first alternative implementation, the control module 216 can further include instructions that function to control the processor 202 to cause a safety signal to be sent to the communications module 218. The communications module 218 can further include instructions that function to control the processor 202 to receive the safety signal from the control module 216. The communications module 218 can further include instructions that function to control the processor 202 to transmit the safety signal to a safety actuator system 240 to cause the vehicle to change from being operated in the current pair of states to being operated in the different pair of states. The safety actuator system 240 can include, for example, one or more of a subsystem that controls the steering of the set of wheels of the vehicle 221 (e.g., the front set of wheels, the rear set of wheels, or both), a subsystem that controls the brake of the one or more wheels of the vehicle 222, a subsystem that controls the clutch of the vehicle 223, a subsystem that controls the position of the throttle of the vehicle 224 (e.g., if the vehicle is propelled by an internal combustion engine), a subsystem that controls the amount of current conveyed to the electric drive motor of the vehicle 225 (e.g., if the vehicle is propelled by an electric motor), a subsystem that controls a suspension of the one or more wheels with respect to a chassis of the vehicle 241, a subsystem that controls a position of a steering operator interface (SOI) 242, a subsystem that controls a force applied to the steering operator interface (SOI) 243, a subsystem that controls a torque applied to the one or more wheels 244, or the like.

Additionally, the instructions of the control module 216 can function to control the processor 202 to determine, based on the coordinates of the point, a set of subsystems of the safety actuator system 240 to cause the vehicle to change from being operated in the current pair of states to being operated in the different pair of states. The set of subsystems can be identified in the safety signal. With reference to FIGS. 1 and 2, for example, if the point that represents the current pair of states of the vehicle is the point I, then an effect of the sideslip on the current pair of states can be greater than an effect of the yaw rate. In this situation, the safety signal can identify that the subsystem that controls the position of the throttle of the vehicle 224 (e.g., if the vehicle is propelled by an internal combustion engine), the subsystem that controls the amount of current conveyed to the electric drive motor of the vehicle 225 (e.g., if the vehicle is propelled by an electric motor), or both (e.g., if the vehicle is a hybrid vehicle) is to be used to cause the vehicle to change from being operated in the current pair of states to being operated in the different pair of states. Alternatively, for example, if the point that represents the current pair of states of the vehicle is a point II, then an effect of the yaw rate on the current pair of states can be greater than an effect of the sideslip. In this situation, the safety signal can identify that the subsystem that controls the steering of the set of wheels of the vehicle 221 (e.g., the front set of wheels, the rear set of wheels, or both) is to be used to cause the vehicle to change from being operated in the current pair of states to being operated in the different pair of states.

Returning to FIG. 2, in a second alternative implementation, a control system 250 can include, for example, a control sensor system 251, a controller 252, and a control actuator system 253. The control sensor system 251 can produce control data in response to an action performed by an operator (O) of the vehicle. The controller 252 can produce a control signal in response to a receipt of the control data. The memory 206 can further store the communications module 218. The communications module 218 can include instructions that function to control the processor 202 to receive (A) the control data from the control sensor system 251, to transmit (B) the control data to the control module 216, to receive (C) the control signal from the controller 252, and to transmit (D) the control signal to the control module 216. The control module 216 can further include instructions that function to control the processor 202 to produce a modified control signal based on the control data, the control signal, and the distance between the point and the second closed curve. A value of the modified control signal can be a multiple of a value of the control signal. The communications module 218 can include instructions that function to receive (E) the modified control signal from the control module 216 and to transmit (F) the modified control signal to the control actuator system 253. The control actuator system 253 can cause, in response to a receipt of the modified control signal, the vehicle to change from being operated in the current pair of states to being operated in the different pair of states.

A value of the multiple can be a measure of a portion of a control of the vehicle that is provided by the system 200. Alternatively, the value of the multiple can be a measure of a portion of the control of the vehicle that is provided by the operator (O) of the vehicle. The value of the multiple can be a function of the coordinates of the point. With reference to FIGS. 1 and 2, for example, because the distance between the point II and the second closed curve 110 is less than the distance between a point III and the second closed curve 110 (i.e., the point II is closer to the second closed curve 110 than the point III), the value of the multiple associated with the point II can reflect that the portion of the control of the vehicle that is provided by the system 200 when the current pair of states of the vehicle is represented by the point II can be greater than the portion of the control of the vehicle that is provided by the system 200 when the current pair of states of the vehicle is represented by the point III. For example, the value of the multiple associated with the point II can reflect that the portion of the control of the vehicle that is provided by the system 200 can be less than or equal to twice the portion of the control of the vehicle that is provided by the operator (O), while the value of the multiple associated with the point III can reflect that the portion of the control of the vehicle that is provided by the system 200 can be less than or equal to the portion of the control of the vehicle that is provided by the operator (O).

For example, if the instructions of the control module 216 determine that, at the current pair of states of the vehicle represented by the point III, the subsystem that controls the steering of the set of wheels of the vehicle 221 (e.g., the front set of wheels, the rear set of wheels, or both) needs to be set to a total angle of ten degrees, but the portion of the control of the vehicle that is provided by the operator (O) causes the subsystem that controls the steering of the set of wheels of the vehicle 221 to be set to an angle of six degrees, then the value of the multiple associated with the point III can reflect that the portion of the control of the vehicle that is provided by the system 200 causes the control actuator system 253, in response to the receipt of the modified control signal, to cause the subsystem that controls the steering of the set of wheels of the vehicle 221 to be set to an angle of an additional four degrees (i.e., less than or equal to six degrees) to provide the total angle of ten degrees.

For example, if the instructions of the control module 216 determine that, at the current pair of states of the vehicle represented by the point II, the subsystem that controls the steering of the set of wheels of the vehicle 221 (e.g., the front set of wheels, the rear set of wheels, or both) needs to be set to a total angle of fifteen degrees, but the portion of the control of the vehicle that is provided by the operator (O) causes the subsystem that controls the steering of the set of wheels of the vehicle 221 to be set to an angle of seven degrees, then the value of the multiple associated with the point II can reflect that the portion of the control of the vehicle that is provided by the system 200 causes the control actuator system 253, in response to the receipt of the modified control signal, to cause the subsystem that controls the steering of the set of wheels of the vehicle 221 to be set to an angle of an additional eight degrees (i.e., less than or equal to fourteen degrees) to provide the total angle of fifteen degrees.

Additionally, the control module 216 can further include instructions that function to control the processor 202 to cause a motion to occur to one or more of a steering operator interface (SOI) 261 (e.g., a steering wheel, a handlebar, a twin lever steering interface, or the like), a brake operator interface 262, a clutch operator interface 263, or a throttle operator interface 264. The motion can represent a feedback signal to the operator (O) of the vehicle. For example, if the instructions of the control module 216 determine that, at the current pair of states of the vehicle represented by the point II, the subsystem that controls the steering of the set of wheels of the vehicle 221 (e.g., the front set of wheels, the rear set of wheels, or both) needs to be set to a total angle of fifteen degrees, but: (1) the portion of the control of the vehicle that is provided by the operator (O) causes the subsystem that controls the steering of the set of wheels of the vehicle 221 to be set to an angle of seven degrees and (2) the portion of the control of the vehicle that is provided by the system 200 causes the subsystem that controls the steering of the set of wheels of the vehicle 221 to be set to an angle of an additional eight degrees (i.e., less than or equal to fourteen degrees) to provide the total angle of fifteen degrees, then the instructions of the control module 216 can cause the motion to occur to the steering operator interface (SOI) 261. The motion can represent the feedback signal to the operator (O).

Returning to FIG. 2, in a third alternative implementation, the control system 250 can include, for example, the control sensor system 251, the controller 252, and the control actuator system 253. The control sensor system 251 can produce the control data in response to the action performed by the operator (O) of the vehicle. The memory 206 can further store the communications module 218. The communications module 218 can include instructions that function to control the processor 202 to receive (A) the control data from the control sensor system 251 and to transmit (B) the control data to the control module 216. The control module 216 can further include instructions that function to control the processor 202 to produce modified control data based on the control data and the distance between the point and the second closed curve. A value of the modified control data can be a multiple of a value of the control data. The communications module 218 can include instructions that function to receive (G) the modified control data from the control module 216 and to transmit (H) the modified control data to the controller 252. The controller 252 can produce a control signal in response to a receipt of the modified control data. The control actuator system 253 can cause, in response to a receipt of the control signal, the vehicle to change from being operated in the current pair of states to being operated in the different pair of states.

The value of the multiple can be a measure of the portion of the control of the vehicle that is provided by the system 200. Alternatively, the value of the multiple can be a measure of the portion of the control of the vehicle that is provided by the operator (O) of the vehicle. The value of the multiple can be a function of the coordinates of the point. With reference to FIGS. 1 and 2, for example, because the distance between the point II and the second closed curve 110 is less than the distance between the point III and the second closed curve 110 (i.e., the point II is closer to the second closed curve 110 than the point III), the value of the multiple associated with the point II can reflect that the portion of the control of the vehicle that is provided by the system 200 when the current pair of states of the vehicle is represented by point II can be greater than the portion of the control of the vehicle that is provided by the system 200 when the current pair of states of the vehicle is represented by the point III. For example, the value of the multiple associated with the point II can reflect that the portion of the control of the vehicle that is provided by the system 200 can be less than or equal to twice the portion of the control of the vehicle that is provided by the operator (O), while the value of the multiple associated with the point III can reflect that the portion of the control of the vehicle that is provided by the system 200 can be less than or equal to the portion of the control of the vehicle that is provided by the operator (O).

For example, if the instructions of the control module 216 determine that, at the current pair of states of the vehicle represented by the point III, the subsystem that controls the steering of the set of wheels of the vehicle 221 (e.g., the front set of wheels, the rear set of wheels, or both) needs to be set to a total angle of ten degrees, but the portion of the control of the vehicle that is provided by the operator (O) causes the subsystem that controls the steering of the set of wheels of the vehicle 221 to be set to an angle of six degrees, then the value of the multiple associated with the point III can reflect that the portion of the control of the vehicle that is provided by the system 200 causes the controller 252, in response to the receipt of the modified control data, to cause the subsystem that controls the steering of the set of wheels of the vehicle 221 to be set to an angle of an additional four degrees (i.e., less than or equal to six degrees) to provide the total angle of ten degrees.

For example, if the instructions of the control module 216 determine that, at the current pair of states of the vehicle represented by the point II, the subsystem that controls the steering of the set of wheels of the vehicle 221 (e.g., the front set of wheels, the rear set of wheels, or both) needs to be set to a total angle of fifteen degrees, but the portion of the control of the vehicle that is provided by the operator (O) causes the subsystem that controls the steering of the set of wheels of the vehicle 221 to be set to an angle of seven degrees, then the value of the multiple associated with the point II can reflect that the portion of the control of the vehicle that is provided by the system 200 causes the controller 252, in response to the receipt of the modified control data, to cause the subsystem that controls the steering of the set of wheels of the vehicle 221 to be set to an angle of an additional eight degrees (i.e., less than or equal to fourteen degrees) to provide the total angle of fifteen degrees.

Additionally, the control module 216 can further include the instructions that function to control the processor 202 to cause the motion to occur to one or more of the steering operator interface (SOI) 261 (e.g., a steering wheel, a handlebar, a twin lever steering interface, or the like), the brake operator interface 262, the clutch operator interface 263, or the throttle operator interface 264. The motion can represent a feedback signal to the operator (O) of the vehicle. For example, if the instructions of the control module 216 determine that, at the current pair of states of the vehicle represented by the point II, the subsystem that controls the steering of the set of wheels of the vehicle 221 (e.g., the front set of wheels, the rear set of wheels, or both) needs to be set to a total angle of fifteen degrees, but: (1) the portion of the control of the vehicle that is provided by the operator (O) causes the subsystem that controls the steering of the set of wheels of the vehicle 221 to be set to an angle of seven degrees and (2) the portion of the control of the vehicle that is provided by the system 200 causes the subsystem that controls the steering of the set of wheels of the vehicle 221 to be set to an angle of an additional eight degrees (i.e., less than or equal to fourteen degrees) to provide the total angle of fifteen degrees, then the instructions of the control module 216 can cause the motion to occur to the steering operator interface (SOI) 261. The motion can represent the feedback signal to the operator (O).

Returning to FIG. 2, in a fourth alternative implementation, the control module 216 can further include instructions that function to control the processor 202 to determine an existence of a condition. The condition can be that the distance between the point and the second closed curve is greater than a threshold distance. With reference to FIG. 1, for example, if the point that represents the current pair of states of the vehicle is a point IV and the threshold distance from the second closed curve is at a point T, then the existence of the condition can be determined to exist because the distance between the point IV and the second closed curve 110 is greater than the threshold distance.

Returning to FIG. 2, in the fourth alternative implementation, the control module 216 can further include instructions that function to control the processor 202 to refrain, in response to a determination of the existence of the condition, from transmitting the safety signal to the safety actuator system 240. The control module 216 can further include instructions that function to control the processor 202 to cause, in response to the determination of the existence of the condition, a communication to be provided to the operator (O) of the vehicle. For example, the communication can include one or more of a visual communication, an audible communication, or a tactile communication. That is, with reference to FIGS. 1 and 2, because the distance between the point IV and the second closed curve 110 is greater than the threshold distance, the control of the vehicle can be provided by the operator (O) rather by the system 200.

Returning to FIG. 2, in the fourth alternative implementation, the control module 216 can further include instructions that function to control the processor 202 to cause, in response to a determination of a lack of the existence of the condition, a transmission of the safety signal to the safety actuator system 240. With reference to FIGS. 1 and 2, for example, if the point that represents the current pair of states of the vehicle is the point I and the threshold distance from the second closed curve 110 is at the point T, then the existence of the condition can be determined to lack to exist because the distance between the point I and the second closed curve 110 is less than the threshold distance. That is, because the distance between the point I and the second closed curve 110 is less than the threshold distance, the control of the vehicle can be provided by the system 200 rather than by the operator (O).

Recall that the coordinates outside of the second closed curve represent the third region of dynamic operation of the vehicle, which can be characterized by an inability of the operation of the control system of the vehicle to cause the vehicle to change from being operated in the current pair of states (i.e., in the third region of dynamic operation) to being operated in the first region of dynamic operation. Having the current pair of states being in the third region of dynamic operation represents a situation that can be dangerous, uncontrollable, or both. For this reason, in response to the determination of the lack of the existence of the condition that the distance between the point and the second closed curve is greater than the threshold distance (i.e., that the distance between the point and the second closed curve is less than the threshold distance (i.e., that the point is close to the second closed curve)), the system 200 can act so that the control of the vehicle is provided by the system 200 rather than by the operator (O).

Figure 3:
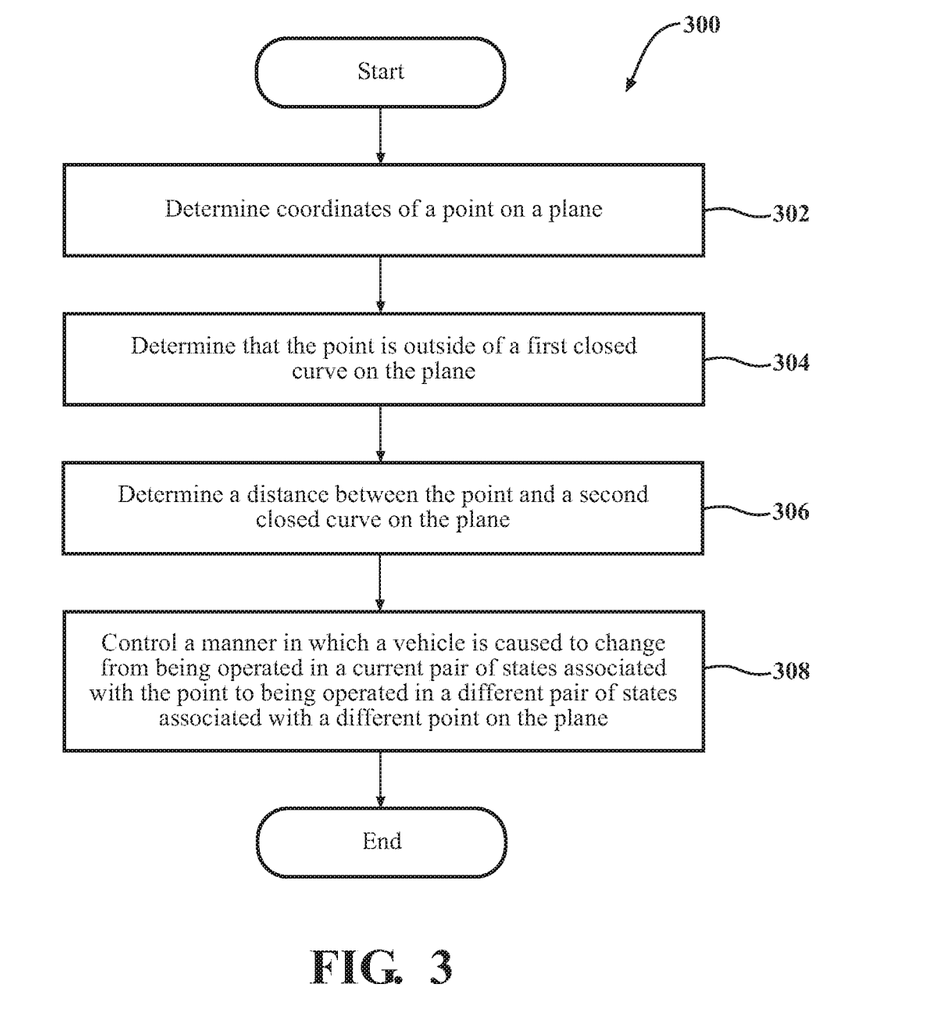
FIG. 3 includes a flow diagram that illustrates an example of a method that is associated with controlling a vehicle, according to the disclosed technologies.

FIG. 3 includes a flow diagram that illustrates an example of a method 300 that is associated with controlling a vehicle, according to the disclosed technologies. The method 300 is described from the perspective of the system 200 illustrated in FIG. 2. Although the method 300 is described in combination with the system 200, one of skill in the art understands, in light of the description herein, that the method 300 is not limited to being implemented by the system 200. Rather, the system 200 is an example of a system that may be used to implement the method 300.

In FIG. 3, in the method 300, at an operation 302, the current position module 210 can determine coordinates of a point on a plane. The plane can be defined by a first axis and a second axis. The first axis can represent a first measurable state of the vehicle. For example, the first measurable state can be a sideslip. The second axis can represent a second measurable state of the vehicle. For example, the second measurable state can be a yaw rate. The coordinates of the point can represent a current pair of states of the vehicle.

At an operation 304, the first closed curve comparison module 212 can determine that the point is outside of a first closed curve on the plane. Coordinates inside of the first closed curve can represent a first region of dynamic operation of the vehicle. The first region of dynamic operation can be characterized by values of forces produced by rear tires of the vehicle being less than a tire saturation force of the rear tires. Thus, in the current pair of states, a relationship that exists between at least one of the rear tires and a surface in contact with the at least one of the rear tires can be characterized as a skid.

At an operation 306, the second closed curve comparison module 214 can determine, in response to the point being outside of the first closed curve, a distance between the point and a second closed curve on the plane. Coordinates inside of the second closed curve can represent a second region of dynamic operation of the vehicle. The second region of dynamic operation can be characterized by an ability of an operation of the control system 220 of the vehicle to cause the vehicle to change from being operated in the current pair of states to being operated in the first region of dynamic operation.

The control system 220 can include, for example, one or more of the subsystem that controls the steering of the set of wheels of the vehicle 221 (e.g., the front set of wheels, the rear set of wheels, or both), the subsystem that controls the brake of one or more wheels of the vehicle 222, the subsystem that controls the clutch of the vehicle 223, the subsystem that controls the position of the throttle of the vehicle 224 (e.g., if the vehicle is propelled by an internal combustion engine), the subsystem that controls the amount of current conveyed to the electric drive motor of the vehicle 225 (e.g., if the vehicle is propelled by an electric motor), or the like. For example, the subsystem that controls the steering of the set of wheels of the vehicle 221 can include a mechanical steering device. For example, the subsystem that controls the brake of the one or more wheels of the vehicle 222 can include a mechanical braking device. For example, the subsystem that controls the clutch of the vehicle 223 can include a mechanical clutch device. For example, the subsystem that controls the position of the throttle of the vehicle 224 can include a mechanical throttling device.

At an operation 308, the control module 216 can control, based on the distance between the point and the second closed curve, a manner in which the vehicle is caused to change from being operated in the current pair of states to being operated in the different pair of states.

In a first alternative implementation, the communications module 218 can receive safety data from the safety sensor system 230. The safety data can be indicative of the coordinates of the point. The safety sensor system 230 can include, for example, one or more of the accelerometer 231, the gyroscope 232, the global navigation satellite system 233, the brake pressure sensor 234, the wheel speed sensor 235, the throttle position sensor 236 (e.g., if the vehicle is propelled by an internal combustion engine), the electric drive motor ammeter 237 (e.g., if the vehicle is propelled by an electric motor), the steering operator interface (SOI) position sensor 238, the steering operator interface (SOI) applied force sensor 239, or the like. For example, the steering operator interface (SOI) can be a steering wheel, a handlebar, a twin lever steering interface, or the like. For example, the safety data can include a measure of a sideslip and a measure of a yaw rate. For example, a sideslip can be estimated with the accelerometer 231 and the gyroscope 232. For example, a yaw rate can be estimated with the gyroscope 232. In the first alternative implementation, at the operation 302, the current position module 210 can determine, based on the safety data, the coordinates of the point.

Additionally or alternatively, in the first alternative implementation, at the operation 308, the communications module 218 can transmit a safety signal to the safety actuator system 240 to cause the vehicle to change from being operated in the current pair of states to being operated in the different pair of states. The safety actuator system 240 can include, for example, one or more of the subsystem that controls the steering of the set of wheels of the vehicle 221 (e.g., the front set of wheels, the rear set of wheels, or both), the subsystem that controls the brake of the one or more wheels of the vehicle 222, the subsystem that controls the clutch of the vehicle 223, the subsystem that controls the position of the throttle of the vehicle 224 (e.g., if the vehicle is propelled by an internal combustion engine), the subsystem that controls the amount of current conveyed to the electric drive motor of the vehicle 225 (e.g., if the vehicle is propelled by an electric motor), the subsystem that controls the suspension of the one or more wheels with respect to the chassis of the vehicle 241, the subsystem that controls the position of the steering operator interface (SOI) 242, the subsystem that controls the force applied to the steering operator interface (SOI) 243, the subsystem that controls the torque applied to the one or more wheels 244, or the like.

Additionally, at the operation 308, the control module 216 can determine, based on the coordinates of the point, a set of subsystems of the safety actuator system 240 to cause the vehicle to change from being operated in the current pair of states to being operated in the different pair of states. The set of subsystems can be identified in the safety signal.

In a second alternative implementation, the control system 250 can include, for example, the control sensor system 251, the controller 252, and the control actuator system 253. The control sensor system 251 can produce control data in response to an action performed by the operator (O) of the vehicle. The controller 252 can produce a control signal in response to a receipt of the control data. In the second alternative implementation, at the operation 308, the control module 216 can produce a modified control signal based on the control data, the control signal, and the distance between the point and the second closed curve. A value of the modified control signal can be a multiple of a value of the control signal. In the second alternative implementation, at the operation 308, the communications module 218 can transmit the modified control signal to the control actuator system 253. The control actuator system 253 can cause, in response to a receipt of the modified control signal, the vehicle to change from being operated in the current pair of states to being operated in the different pair of states. A value of the multiple can be a function of the coordinates of the point. Additionally, in the second alternative implementation, at the operation 308, the control module 216 can cause a motion to occur to one or more of the steering operator interface (SOI) 261 (e.g., the steering wheel, the handlebar, the twin lever steering interface, or the like), the brake operator interface 262, the clutch operator interface 263, or the throttle operator interface 264. The motion can represent a feedback signal to the operator (O).

In a third alternative implementation, the control system 250 can include, for example, the control sensor system 251, the controller 252, and the control actuator system 253. The control sensor system 251 can produce the control data in response to the action performed by the operator (O) of the vehicle. In the third alternative implementation, at the operation 308, the control module 216 can produce modified control data based on the control data and the distance between the point and the second closed curve. A value of the modified control data can be a multiple of a value of the control data. In the third alternative implementation, at the operation 308, the communications module 218 can transmit the modified control data to the controller 252. The controller 252 can produce a control signal in response to a receipt of the modified control data. The control actuator system 253 can cause, in response to a receipt of the control signal, the vehicle to change from being operated in the current pair of states to being operated in the different pair of states. The value of the multiple can be a function of the coordinates of the point. Additionally, in the third alternative implementation, at the operation 308, the control module 216 can cause the motion to occur to one or more of the steering operator interface (SOI) 261 (e.g., the steering wheel, the handlebar, the twin lever steering interface, or the like), the brake operator interface 262, the clutch operator interface 263, or the throttle operator interface 264. The motion can represent a feedback signal to the operator (O).

In a fourth alternative implementation, at the operation 308, the control module 216 can determine an existence of a condition. The condition can be that the distance between the point and the second closed curve is greater than a threshold distance. In the fourth alternative implementation, at the operation 308, the control module 216 can refrain, in response to a determination of the existence of the condition, from transmitting the safety signal to the safety actuator system 240. In the fourth alternative implementation, at the operation 308, the control module 216 can cause, in response to the determination of the existence of the condition, a communication to be provided to the operator (O) of the vehicle. For example, the communication can include one or more of a visual communication, an audible communication, or a tactile communication. In the fourth alternative implementation, at the operation 308, the control module 216 can cause, in response to a determination of a lack of the existence of the condition, a transmission of the safety signal to the safety actuator system 240.

Figure 4:
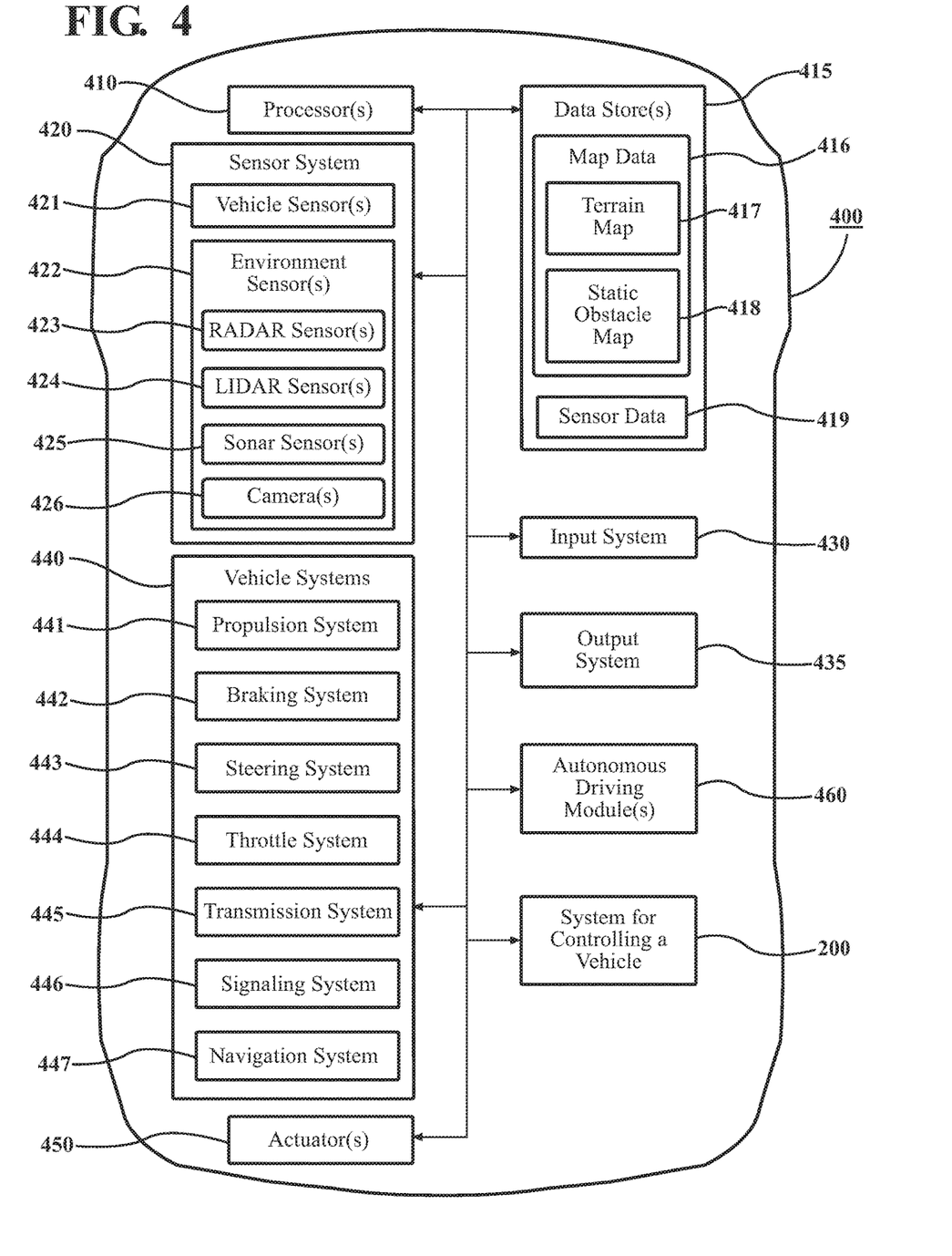
FIG. 4 includes a block diagram that illustrates an example of elements disposed on a vehicle, according to the disclosed technologies.

FIG. 4 includes a block diagram that illustrates an example of elements disposed on a vehicle 400, according to the disclosed technologies. As used herein, a "vehicle" can be any form of powered transport. In one or more implementations, the vehicle 400 can be an automobile. While arrangements described herein are with respect to automobiles, one of skill in the art understands, in light of the description herein, that embodiments are not limited to automobiles.

In some embodiments, the vehicle 400 can be configured to switch selectively between an autonomous mode, one or more semi-autonomous operational modes, and/or a manual mode. Such switching can be implemented in a suitable manner, now known or later developed. As used herein, "manual mode" can refer that all of or a majority of the navigation and/or maneuvering of the vehicle 400 is performed according to inputs received from a user (e.g., human driver). In one or more arrangements, the vehicle 400 can be a conventional vehicle that is configured to operate in only a manual mode.

In one or more embodiments, the vehicle 400 can be an autonomous vehicle. As used herein, "autonomous vehicle" can refer to a vehicle that operates in an autonomous mode. As used herein, "autonomous mode" can refer to navigating and/or maneuvering the vehicle 400 along a travel route using one or more computing systems to control the vehicle 400 with minimal or no input from a human driver. In one or more embodiments, the vehicle 400 can be highly automated or completely automated. In one embodiment, the vehicle 400 can be configured with one or more semi-autonomous operational modes in which one or more computing systems perform a portion of the navigation and/or maneuvering of the vehicle along a travel route, and a vehicle operator (i.e., driver) provides inputs to the vehicle 400 to perform a portion of the navigation and/or maneuvering of the vehicle 400 along a travel route.

The vehicle 400 can include various elements. The vehicle 400 can have any combination of the various elements illustrated in FIG. 4. In various embodiments, it may not be necessary for the vehicle 400 to include all of the elements illustrated in FIG. 4. Furthermore, the vehicle 400 can have elements in addition to those illustrated in FIG. 4. While the various elements are illustrated in FIG. 4 as being located within the vehicle 400, one or more of these elements can be located external to the vehicle 400. Furthermore, the elements illustrated may be physically separated by large distances. For example, as described, one or more components of the disclosed system can be implemented within the vehicle 400 while other components of the system can be implemented within a cloud-computing environment, as described below. For example, the elements can include one or more processors 410, one or more data stores 415, a sensor system 420, an input system 430, an output system 435, vehicle systems 440, one or more actuators 450, one or more autonomous driving modules 460, and the system 200 for controlling a vehicle.

In one or more arrangements, the one or more processors 410 can be a main processor of the vehicle 400. For example, the one or more processors 410 can be an electronic control unit (ECU). For example, functions and/or operations of the processor 202 (illustrated in FIG. 2) can be realized by the one or more processors 410.

The one or more data stores 415 can store, for example, one or more types of data. For example, functions and/or operations of the data store 204 and/or the memory 206 (illustrated in FIG. 2) can be realized by the one or more data stores 415. The one or more data store 415 can include volatile memory and/or non-volatile memory. Examples of suitable memory for the one or more data stores 415 can include Random-Access Memory (RAM), flash memory, Read-Only Memory (ROM), Programmable Read-Only Memory (PROM), Erasable Programmable Read-Only Memory (EPROM), Electrically Erasable Programmable Read-Only Memory (EEPROM), registers, magnetic disks, optical disks, hard drives, any other suitable storage medium, or any combination thereof. The one or more data stores 415 can be a component of the one or more processors 410. Additionally or alternatively, the one or more data stores 415 can be operatively connected to the one or more processors 410 for use thereby. As used herein, "operatively connected" can include direct or indirect connections, including connections without direct physical contact. As used herein, a statement that a component can be "configured to" perform an operation can be understood to mean that the component requires no structural alterations, but merely needs to be placed into an operational state (e.g., be provided with electrical power, have an underlying operating system running, etc.) in order to perform the operation.

In one or more arrangements, the one or more data stores 415 can store map data 416. The map data 416 can include maps of one or more geographic areas. In some instances, the map data 416 can include information or data on roads, traffic control devices, road markings, structures, features, and/or landmarks in the one or more geographic areas. The map data 416 can be in any suitable form. In some instances, the map data 416 can include aerial views of an area. In some instances, the map data 416 can include ground views of an area, including 360-degree ground views. The map data 416 can include measurements, dimensions, distances, and/or information for one or more items included in the map data 416 and/or relative to other items included in the map data 416. The map data 416 can include a digital map with information about road geometry. The map data 416 can be high quality and/or highly detailed.

In one or more arrangements, the map data 416 can include one or more terrain maps 417. The one or more terrain maps 417 can include information about the ground, terrain, roads, surfaces, and/or other features of one or more geographic areas. The one or more terrain maps 417 can include elevation data of the one or more geographic areas. The map data 416 can be high quality and/or highly detailed. The one or more terrain maps 417 can define one or more ground surfaces, which can include paved roads, unpaved roads, land, and other things that define a ground surface.

In one or more arrangements, the map data 416 can include one or more static obstacle maps 418. The one or more static obstacle maps 418 can include information about one or more static obstacles located within one or more geographic areas. A "static obstacle" can be a physical object whose position does not change (or does not substantially change) over a period of time and/or whose size does not change (or does not substantially change) over a period of time. Examples of static obstacles can include trees, buildings, curbs, fences, railings, medians, utility poles, statues, monuments, signs, benches, furniture, mailboxes, large rocks, and hills. The static obstacles can be objects that extend above ground level. The one or more static obstacles included in the one or more static obstacle maps 418 can have location data, size data, dimension data, material data, and/or other data associated with them. The one or more static obstacle maps 418 can include measurements, dimensions, distances, and/or information for one or more static obstacles. The one or more static obstacle maps 418 can be high quality and/or highly detailed. The one or more static obstacle maps 418 can be updated to reflect changes within a mapped area.

In one or more arrangements, the one or more data stores 415 can store sensor data 419. As used herein, "sensor data" can refer to any information about the sensors with which the vehicle 400 can be equipped including the capabilities of and other information about such sensors. The sensor data 419 can relate to one or more sensors of the sensor system 420. For example, in one or more arrangements, the sensor data 419 can include information about one or more lidar sensors 424 of the sensor system 420. For example, functions and/or operations of the safety sensor system 230 (illustrated in FIG. 2) can be realized by the sensor system 420.

In some arrangements, at least a portion of the map data 416 and/or the sensor data 419 can be located in one or more data stores 415 that are located onboard the vehicle 400. Alternatively or additionally, at least a portion of the map data 416 and/or the sensor data 419 can be located in one or more data stores 415 that are located remotely from the vehicle 400.

The sensor system 420 can include one or more sensors. As used herein, a "sensor" can refer to any device, component, and/or system that can detect and/or sense something. The one or more sensors can be configured to detect and/or sense in real-time. As used herein, the term "real-time" can refer to a level of processing responsiveness that is perceived by a user or system to be sufficiently immediate for a particular process or determination to be made, or that enables the processor to keep pace with some external process.

In arrangements in which the sensor system 420 includes a plurality of sensors, the sensors can work independently from each other. Alternatively, two or more of the sensors can work in combination with each other. In such a case, the two or more sensors can form a sensor network. The sensor system 420 and/or the one or more sensors can be operatively connected to the one or more processors 410, the one or more data stores 415, and/or another element of the vehicle 400 (including any of the elements illustrated in FIG. 4). The sensor system 420 can acquire data of at least a portion of the external environment of the vehicle 400 (e.g., nearby vehicles). The sensor system 420 can include any suitable type of sensor. Various examples of different types of sensors are described herein. However, one of skill in the art understands that the embodiments are not limited to the particular sensors described herein.

The sensor system 420 can include one or more vehicle sensors 421. The one or more vehicle sensors 421 can detect, determine, and/or sense information about the vehicle 400 itself. In one or more arrangements, the one or more vehicle sensors 421 can be configured to detect and/or sense position and orientation changes of the vehicle 400 such as, for example, based on inertial acceleration. In one or more arrangements, the one or more vehicle sensors 421 can include one or more accelerometers, one or more gyroscopes, an inertial measurement unit (IMU), a dead-reckoning system, a global navigation satellite system (GNSS), a global positioning system (GPS), a navigation system 447, and/or other suitable sensors. The one or more vehicle sensors 421 can be configured to detect and/or sense one or more characteristics of the vehicle 400. In one or more arrangements, the one or more vehicle sensors 421 can include a speedometer to determine a current speed of the vehicle 400.

Alternatively or additionally, the sensor system 420 can include one or more environment sensors 422 configured to acquire and/or sense driving environment data. As used herein, "driving environment data" can include data or information about the external environment in which a vehicle is located or one or more portions thereof. For example, the one or more environment sensors 422 can be configured to detect, quantify, and/or sense obstacles in at least a portion of the external environment of the vehicle 400 and/or information/data about such obstacles. Such obstacles may be stationary objects and/or dynamic objects. The one or more environment sensors 422 can be configured to detect, measure, quantify, and/or sense other things in the external environment of the vehicle 400 such as, for example, lane markers, signs, traffic lights, traffic signs, lane lines, crosswalks, curbs proximate the vehicle 400, off-road objects, etc.

Various examples of sensors of the sensor system 420 are described herein. The example sensors may be part of the one or more vehicle sensors 421 and/or the one or more environment sensors 422. However, one of skill in the art understands that the embodiments are not limited to the particular sensors described.

In one or more arrangement, the one or more environment sensors 422 can include one or more radar sensors 423, one or more lidar sensors 424, one or more sonar sensors 425, and/or one more cameras 426. In one or more arrangements, the one or more cameras 426 can be one or more high dynamic range (HDR) cameras or one or more infrared (IR) cameras. For example, the one or more cameras 426 can be used to record a reality of a state of an item of information that can appear in digital map.

The input system 430 can include any device, component, system, element, arrangement, or groups thereof that enable information/data to be entered into a machine. The input system 430 can receive an input from a vehicle passenger (e.g., a driver or a passenger). The output system 435 can include any device, component, system, element, arrangement, or groups thereof that enable information/data to be presented to a vehicle passenger (e.g., a driver or a passenger).

Various examples of the one or more vehicle systems 440 are illustrated in FIG. 4. However, one of skill in the art understands that the vehicle 400 can include more, fewer, or different vehicle systems. Although particular vehicle systems can be separately defined, each or any of the systems or portions thereof may be otherwise combined or segregated via hardware and/or software within the vehicle 400. For example, the one or more vehicle systems 440 can include a propulsion system 441, a braking system 442, a steering system 443, a throttle system 444, a transmission system 445, a signaling system 446, and/or the navigation system 447. Each of these systems can include one or more devices, components, and/or a combination thereof, now known or later developed. For example, functions and/or operations of the control system 220 and/or the control system 250 (illustrated in FIG. 2) can be realized by the one or more vehicle systems 440. For example, functions and/or operations of the subsystem that controls the brake of one or more wheels of the vehicle 222 (illustrated in FIG. 2) can be realized by the braking system 442. For example, functions and/or operations of the subsystem that controls the steering of the set of wheels of the vehicle 221 (illustrated in FIG. 2) can be realized by the steering system 443. For example, functions and/or operations of the subsystem that controls the position of the throttle of the vehicle 224 (illustrated in FIG. 2) can be realized by the throttle system 444. For example, functions and/or operations of the subsystem that controls the clutch of the vehicle 223 (illustrated in FIG. 2) can be realized by the transmission system 445.

The navigation system 447 can include one or more devices, applications, and/or combinations thereof, now known or later developed, configured to determine the geographic location of the vehicle 400 and/or to determine a travel route for the vehicle 400. The navigation system 447 can include one or more mapping applications to determine a travel route for the vehicle 400. The navigation system 447 can include a global positioning system, a local positioning system, a geolocation system, and/or a combination thereof.

The one or more actuators 450 can be any element or combination of elements operable to modify, adjust, and/or alter one or more of the vehicle systems 440 or components thereof responsive to receiving signals or other inputs from the one or more processors 410 and/or the one or more autonomous driving modules 460. Any suitable actuator can be used. For example, the one or more actuators 450 can include motors, pneumatic actuators, hydraulic pistons, relays, solenoids, and/or piezoelectric actuators. For example, functions and/or operations of the safety actuator system 240 (illustrated in FIG. 2) can be realized by the one or more actuators 450.

The one or more processors 410 and/or the one or more autonomous driving modules 460 can be operatively connected to communicate with the various vehicle systems 440 and/or individual components thereof. For example, the one or more processors 410 and/or the one or more autonomous driving modules 460 can be in communication to send and/or receive information from the various vehicle systems 440 to control the movement, speed, maneuvering, heading, direction, etc. of the vehicle 400. The one or more processors 410 and/or the one or more autonomous driving modules 460 may control some or all of these vehicle systems 440 and, thus, may be partially or fully autonomous.

The one or more processors 410 and/or the one or more autonomous driving modules 460 may be operable to control the navigation and/or maneuvering of the vehicle 400 by controlling one or more of the vehicle systems 440 and/or components thereof. For example, when operating in an autonomous mode, the one or more processors 410 and/or the one or more autonomous driving modules 460 can control the direction and/or speed of the vehicle 400. The one or more processors 410 and/or the one or more autonomous driving modules 460 can cause the vehicle 400 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" can mean to make, force, compel, direct, command, instruct, and/or enable an event or action to occur or at least be in a state where such event or action may occur, either in a direct or indirect manner.

The vehicle 400 can include one or more modules, at least some of which are described herein. The modules can be implemented as computer-readable program code that, when executed by the one or more processors 410, implement one or more of the various processes described herein. One or more of the modules can be a component of the one or more processors 410. Alternatively or additionally, one or more of the modules can be executed on and/or distributed among other processing systems to which the one or more processors 410 can be operatively connected. The modules can include instructions (e.g., program logic) executable by the one or more processors 410. Alternatively or additionally, the one or more data store 415 may contain such instructions.

In one or more arrangements, one or more of the modules described herein can include artificial or computational intelligence elements, e.g., neural network, fuzzy logic, or other machine learning algorithms. Further, in one or more arrangements, one or more of the modules can be distributed among a plurality of the modules described herein. In one or more arrangements, two or more of the modules described herein can be combined into a single module.

The vehicle 400 can include one or more autonomous driving modules 460. The one or more autonomous driving modules 460 can be configured to receive data from the sensor system 420 and/or any other type of system capable of capturing information relating to the vehicle 400 and/or the external environment of the vehicle 400. In one or more arrangements, the one or more autonomous driving modules 460 can use such data to generate one or more driving scene models. The one or more autonomous driving modules 460 can determine position and velocity of the vehicle 400. The one or more autonomous driving modules 460 can determine the location of obstacles, obstacles, or other environmental features including traffic signs, trees, shrubs, neighboring vehicles, pedestrians, etc.

The one or more autonomous driving modules 460 can be configured to receive and/or determine location information for obstacles within the external environment of the vehicle 400 for use by the one or more processors 410 and/or one or more of the modules described herein to estimate position and orientation of the vehicle 400, vehicle position in global coordinates based on signals from a plurality of satellites, or any other data and/or signals that could be used to determine the current state of the vehicle 400 or determine the position of the vehicle 400 with respect to its environment for use in either creating a map or determining the position of the vehicle 400 in respect to map data.

The one or more autonomous driving modules 460 can be configured to determine one or more travel paths, current autonomous driving maneuvers for the vehicle 400, future autonomous driving maneuvers and/or modifications to current autonomous driving maneuvers based on data acquired by the sensor system 420, driving scene models, and/or data from any other suitable source such as determinations from the sensor data 419. As used herein, "driving maneuver" can refer to one or more actions that affect the movement of a vehicle. Examples of driving maneuvers include: accelerating, decelerating, braking, turning, moving in a lateral direction of the vehicle 400, changing travel lanes, merging into a travel lane, and/or reversing, just to name a few possibilities. The one or more autonomous driving modules 460 can be configured to implement determined driving maneuvers. The one or more autonomous driving modules 460 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The one or more autonomous driving modules 460 can be configured to execute various vehicle functions and/or to transmit data to, receive data from, interact with, and/or control the vehicle 400 or one or more systems thereof (e.g., one or more of vehicle systems 440). For example, functions and/or operations of an automotive navigation system can be realized by the one or more autonomous driving modules 460.

Detailed embodiments are disclosed herein. However, one of skill in the art understands, in light of the description herein, that the disclosed embodiments are intended only as examples. Therefore, specific structural and functional details disclosed herein are not to be interpreted as limiting, but merely as a basis for the claims and as a representative basis for teaching one of skill in the art to variously employ the aspects herein in virtually any appropriately detailed structure. Furthermore, the terms and phrases used herein are not intended to be limiting but rather to provide an understandable description of possible implementations. Various embodiments are illustrated in FIGS. 1-4, but the embodiments are not limited to the illustrated structure or application.

The flowchart and block diagrams in the figures illustrate the architecture, functionality, and operation of possible implementations of systems, methods, and computer program products according to various embodiments. In this regard, each block in flowcharts or block diagrams may represent a module, segment, or portion of code, which comprises one or more executable instructions for implementing the specified logical function(s). One of skill in the art understands, in light of the description herein, that, in some alternative implementations, the functions described in a block may occur out of the order depicted by the figures. For example, two blocks depicted in succession may, in fact, be executed substantially concurrently, or the blocks may be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suitable. A typical combination of hardware and software can be a processing system with computer-readable program code that, when loaded and executed, controls the processing system such that it carries out the methods described herein. The systems, components, and/or processes also can be embedded in a computer-readable storage, such as a computer program product or other data programs storage device, readable by a machine, tangibly embodying a program of instructions executable by the machine to perform methods and processes described herein. These elements also can be embedded in an application product that comprises all the features enabling the implementation of the methods described herein and that, when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. As used herein, the phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples of the computer-readable storage medium would include, in a non-exhaustive list, the following: a portable computer diskette, a hard disk drive (HDD), a solid-state drive (SSD), a read-only memory (ROM), an erasable programmable read-only memory (EPROM or flash memory), a portable compact disc read-only memory (CD-ROM), a digital versatile disc (DVD), an optical storage device, a magnetic storage device, or any suitable combination of the foregoing. As used herein, a computer-readable storage medium may be any tangible medium that can contain or store a program for use by or in connection with an instruction execution system, apparatus, or device.

Generally, modules, as used herein, include routines, programs, objects, components, data structures, and so on that perform particular tasks or implement particular data types. In further aspects, a memory generally stores such modules. The memory associated with a module may be a buffer or may be cache embedded within a processor, a random-access memory (RAM), a ROM, a flash memory, or another suitable electronic storage medium. In still further aspects, a module as used herein, may be implemented as an application-specific integrated circuit (ASIC), a hardware component of a system on a chip (SoC), a programmable logic array (PLA), or another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, radio frequency (RF), etc., or any suitable combination of the foregoing. Computer program code for carrying out operations for aspects of the disclosed technologies may be written in any combination of one or more programming languages, including an object-oriented programming language such as Java™, Smalltalk, C++, or the like, and conventional procedural programming languages such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . or . . . " as used herein refers to and encompasses any and all possible combinations of one or more of the associated listed items. For example, the phrase "at least one of A, B, or C" includes A only, B only, C only, or any combination thereof (e.g., AB, AC, BC, or ABC).

Aspects herein can be embodied in other forms without departing from the spirit or essential attributes thereof.

Accordingly, reference should be made to the following claims, rather than to the foregoing specification, as indicating the scope hereof.

What is claimed is:

1. A system for controlling a vehicle, the system comprising:
   one or more processors disposed in the vehicle;
   a data store communicably coupled to the one or more processors and storing coordinates of a plane, the plane being defined by a first axis and a second axis, the first axis representing a first measurable state of the vehicle, the second axis representing a second measurable state of the vehicle; and
   a memory communicably coupled to the one or more processors and storing:
      a current position module including instructions that when executed by the one or more processors cause the one or more processors to determine coordinates of a point on the plane, the coordinates of the point representing a current pair of states of the vehicle;
      a first closed curve comparison module including instructions that when executed by the one or more processors cause the one or more processors to determine that the point is outside of a first closed curve on the plane, coordinates inside of the first closed curve representing a first region of dynamic operation of the vehicle, the first region of dynamic operation being characterized by values of forces produced by rear tires of the vehicle being less than a tire saturation force of the rear tires;
      a second closed curve comparison module including instructions that when executed by the one or more processors cause the one or more processors to determine, in response to the point being outside of the first closed curve, a distance between the point and a second closed curve on the plane, coordinates inside of the second closed curve representing a second region of dynamic operation of the vehicle, the second region of dynamic operation being characterized by an ability of an operation of a control system of the vehicle to cause the vehicle to change from being operated in the current pair of states to being operated in the first region of dynamic operation; and
      a control module including instructions that when executed by the one or more processors cause the one or more processors to control, based on the distance between the point and the second closed curve, a manner in which the vehicle is caused to change from being operated in the current pair of states to being operated in a different pair of states, coordinates of a different point, on the plane, representing the different pair of states, a distance between the different point and the second closed curve being greater than the distance between the point and the second closed curve.

2. The system of claim 1, wherein the control system comprises at least one of:
   a subsystem that controls a steering of a set of wheels of the vehicle,
   a subsystem that controls a brake of at least one wheel of the vehicle,
   a subsystem that controls a clutch of the vehicle,
   a subsystem that controls a position of a throttle of the vehicle, or
   a subsystem that controls an amount of current conveyed to an electric drive motor of the vehicle.

3. The system of claim 2, wherein at least one of:
   the subsystem that controls the steering of the set of wheels of the vehicle includes a mechanical steering device,
   the subsystem that controls the brake of the at least one wheel of the vehicle includes a mechanical braking device,
   the subsystem that controls the clutch of the vehicle includes a mechanical clutch device, or
   the subsystem that controls the position of the throttle of the vehicle includes a mechanical throttling device.

4. The system of claim 1, wherein:
   the memory further stores a communications module including instructions that when executed by the one or more processors cause the one or more processors to:
      receive safety data from a safety sensor system, the safety data being indicative of the coordinates of the point, and
      transmit the safety data to the current position module; and
   the instructions of the current position module include instructions that when executed by the one or more processors cause the one or more processors to determine, based on the safety data, the coordinates of the point.

5. The system of claim 4, wherein the safety sensor system comprises at least one of an accelerometer, a gyroscope, a global navigation satellite system, a brake pressure sensor, a wheel speed sensor, a throttle position sensor, an electric drive motor ammeter, a steering operator interface position sensor, or a steering operator interface applied force sensor.

6. The system of claim 1, wherein:
   the instructions of the control module include instructions that when executed by the one or more processors cause the one or more processors to cause a safety signal to be sent to a communications module; and
   the memory further stores the communications module including instructions that when executed by the one or more processors cause the one or more processors to:
      receive the safety signal from the control module, and
      transmit the safety signal to a safety actuator system to cause the vehicle to change from being operated in the current pair of states to being operated in the different pair of states.

7. The system of claim 6, wherein the safety actuator system comprises at least one of:
   a subsystem that controls a steering of a set of wheels of the vehicle,
   a subsystem that controls a brake of at least one wheel of the vehicle,
   a subsystem that controls a clutch of the vehicle,
   a subsystem that controls a position of a throttle of the vehicle,
   a subsystem that controls an amount of current conveyed to an electric drive motor of the vehicle,
   a subsystem that controls a suspension of the at least one wheel with respect to a chassis of the vehicle,
   a subsystem that controls a position of a steering operator interface,
   a subsystem that controls a force applied to the steering operator interface, or
   a subsystem that controls a torque applied to the at least one wheel.

8. The system of claim 6, wherein the instructions of the control module include instructions that when executed by the one or more processors cause the one or more processors to determine, based on the coordinates of the point, a set of subsystems of the safety actuator system to cause the vehicle to change from being operated in the current pair of states to being operated in the different pair of states, the set of subsystems being identified in the safety signal.

9. The system of claim 1, wherein:
the control system comprises a control sensor system, a controller, and a control actuator system;
the control sensor system produces control data in response to an action performed by an operator of the vehicle;
the controller produces a control signal in response to a receipt of the control data;
the control actuator system causes, in response to a receipt of a modified control signal, the vehicle to change from being operated in the current pair of states to being operated in the different pair of states;
the memory further stores a communications module including instructions that when executed by the one or more processors cause the one or more processors to:
receive the control data from the control sensor system,
transmit the control data to the control module,
receive the control signal from the controller,
transmit the control signal to the control module,
receive the modified control signal from the control module, and
transmit the modified control signal to the control actuator system; and
the instructions of the control module include instructions that when executed by the one or more processors cause the one or more processors to produce the modified control signal based on the control data, the control signal, and the distance between the point and the second closed curve, a value of the modified control signal being a multiple of a value of the control signal.

10. The system of claim 9, wherein a value of the multiple is a function of the coordinates of the point.

11. The system of claim 9, wherein the instructions of the control module include instructions that when executed by the one or more processors cause the one or more processors to cause a motion to occur to at least one of a steering operator interface, a brake operator interface, a clutch operator interface, or a throttle operator interface, the motion representing a feedback signal to an operator of the vehicle.

12. The system of claim 1, wherein:
the control system comprises a control sensor system, a controller, and a control actuator system;
the control sensor system produces control data in response to an action performed by an operator of the vehicle;
the controller produces a control signal in response to a receipt of modified control data;
the control actuator system causes, in response to a receipt of the control signal, the vehicle to change from being operated in the current pair of states to being operated in the different pair of states;
the memory further stores a communications module including instructions that when executed by the one or more processors cause the one or more processors to:
receive the control data from the control sensor system,
transmit the control data to the control module,
receive the modified control data from the control module, and
transmit the modified control data to the controller; and
the instructions of the control module include instructions that when executed by the one or more processors cause the one or more processors to produce the modified control data based on the control data and the distance between the point and the second closed curve, a value of the modified control data being a multiple of a value of the control data.

13. The system of claim 12, wherein a value of the multiple is a function of the coordinates of the point.

14. The system of claim 12, wherein the instructions of the control module include instructions that when executed by the one or more processors cause the one or more processors to cause a motion to occur to at least one of a steering operator interface, a brake operator interface, a clutch operator interface, or a throttle operator interface, the motion representing a feedback signal to an operator of the vehicle.

15. The system of claim 1, wherein the instructions of the control module include instructions that when executed by the one or more processors cause the one or more processors to:
determine an existence of a condition, the condition being that the distance between the point and the second closed curve is greater than a threshold distance;
refrain, in response to a determination of the existence of the condition, from transmitting a safety signal to a safety actuator system;
cause, in response to the determination of the existence of the condition, a communication to be provided to an operator of the vehicle; and
cause, in response to a determination of a lack of the existence of the condition, a transmission of the safety signal to the safety actuator system.

16. The system of claim 15, wherein the communication comprises at least one of a visual communication, an audible communication, or a tactile communication.

17. A method for controlling a vehicle, the method comprising:
determining, by a processor disposed in the vehicle, coordinates of a point on a plane, the plane being defined by a first axis and a second axis, the first axis representing a first measurable state of the vehicle, the second axis representing a second measurable state of the vehicle, the coordinates of the point representing a current pair of states of the vehicle;
determining, by the processor, that the point is outside of a first closed curve on the plane, coordinates inside of the first closed curve representing a first region of dynamic operation of the vehicle, the first region of dynamic operation being characterized by values of forces produced by rear tires of the vehicle being less than a tire saturation force of the rear tires;
determining, by the processor and in response to the point being outside of the first closed curve, a distance between the point and a second closed curve on the plane, coordinates inside of the second closed curve representing a second region of dynamic operation of the vehicle, the second region of dynamic operation being characterized by an ability of an operation of a control system of the vehicle to cause the vehicle to change from being operated in the current pair of states to being operated in the first region of dynamic operation; and
controlling, by the processor and based on the distance between the point and the second closed curve, a manner in which the vehicle is caused to change from being operated in the current pair of states to being operated in a different pair of states, coordinates of a different point, on the plane, representing the different pair of states, a distance between the different point and the second closed curve being greater than the distance between the point and the second closed curve.

18. The method of claim 17, wherein the first measurable state is a sideslip and the second measurable state is a yaw rate.

19. The method of claim 17, wherein, in the current pair of states, a relationship that exists between at least one of the rear tires and a surface in contact with the at least one of the rear tires is characterized as a skid.

20. A non-transitory computer-readable medium for controlling a vehicle, the non-transitory computer-readable medium including instructions that when executed by one or more processors, disposed in a vehicle, cause the one or more processors to:
   determine coordinates of a point on a plane, the plane being defined by a first axis and a second axis, the first axis representing a first measurable state of the vehicle, the second axis representing a second measurable state of the vehicle, the coordinates of the point representing a current pair of states of the vehicle;
   determine that the point is outside of a first closed curve on the plane, coordinates inside of the first closed curve representing a first region of dynamic operation of the vehicle, the first region of dynamic operation being characterized by values of forces produced by rear tires of the vehicle being less than a tire saturation force of the rear tires;
   determine, in response to the point being outside of the first closed curve, a distance between the point and a second closed curve on the plane, coordinates inside of the second closed curve representing a second region of dynamic operation of the vehicle, the second region of dynamic operation being characterized by an ability of an operation of a control system of the vehicle to cause the vehicle to change from being operated in the current pair of states to being operated in the first region of dynamic operation; and
   control, based on the distance between the point and the second closed curve, a manner in which the vehicle is caused to change from being operated in the current pair of states to being operated in a different pair of states, coordinates of a different point, on the plane, representing the different pair of states, a distance between the different point and the second closed curve being greater than the distance between the point and the second closed curve.

* * * * *